United States Patent [19]

Takahashi

[11] Patent Number: 5,784,107
[45] Date of Patent: Jul. 21, 1998

[54] METHOD AND APPARATUS FOR PICTURE CODING AND METHOD AND APPARATUS FOR PICTURE DECODING

[75] Inventor: Toshiya Takahashi, Takatsuki, Japan

[73] Assignee: Matsushita Electric Industrial Co., Ltd., Osaka, Japan

[21] Appl. No.: 590,212

[22] Filed: Jan. 23, 1996

Related U.S. Application Data

[63] Continuation of Ser. No. 157,627, Nov. 24, 1993, abandoned, which is a continuation-in-part of Ser. No. 871,697, Apr. 21, 1992, Pat. No. 5,347,309.

[30] Foreign Application Priority Data

Jun. 17, 1991 [JP] Japan ................................. 3-144445
Nov. 25, 1992 [JP] Japan ................................. 4-314815

[51] Int. Cl.⁶ ..................................................... H04N 7/32
[52] U.S. Cl. ........................................ 348/412; 348/415
[58] Field of Search ......................... 348/384, 390, 348/400–403, 405, 407, 409–412, 413, 415, 416, 699, 700; 382/232, 236, 238; H04N 7/130, 7/137

[56] References Cited

U.S. PATENT DOCUMENTS

| | | |
|---|---|---|
| 3,761,613 | 9/1973 | Limb . |
| 4,217,609 | 8/1980 | Hatori et al. . |
| 4,271,609 | 6/1981 | Hatori et al. . |
| 4,546,386 | 10/1985 | Matsumoto et al. ................ 348/412 |
| 4,571,618 | 2/1986 | Hatori et al. ....................... 348/412 |
| 4,734,767 | 3/1988 | Kaneko et al. ...................... 348/400 |
| 4,931,869 | 6/1990 | Amor et al. ........................ 348/403 |
| 5,038,209 | 8/1991 | Hang ................................... 348/405 |
| 5,091,782 | 2/1992 | Krause et al. ....................... 348/400 |
| 5,134,472 | 7/1992 | Abe ..................................... 348/700 |
| 5,168,357 | 12/1992 | Kutka . |
| 5,216,712 | 6/1993 | Shimoda et al. .................... 348/405 |
| 5,227,878 | 7/1993 | Puri et al. . |
| 5,267,037 | 11/1993 | Sugiyama ........................... 348/384 |
| 5,386,249 | 1/1995 | Strolle et al. ....................... 348/700 |
| 5,404,174 | 4/1995 | Sugahara ............................. 348/412 |

FOREIGN PATENT DOCUMENTS

| | | |
|---|---|---|
| 0510972 | 10/1992 | European Pat. Off. . |
| 58137379 | 8/1983 | Japan . |
| 59-128881 | 7/1984 | Japan . |
| 4-108285 | 4/1992 | Japan . |
| 5-91500 | 4/1993 | Japan . |
| 87/04033 | 7/1987 | WIPO . |

OTHER PUBLICATIONS

1989 Autumn National Convention Record, The Institute Of Electronics, Information And Communication Engineers, Part 6, D-54, pp. 6–54 (Sep. 1989) (w/translation).

Y. Ohtsuka et al., "Development of 135 Mbit/s HDTV codec", *Signal Processing Image Communication*, Nos. 4/5, vol. 4, pp. 379–387, Sep. 1992.

Irie et al., "Adaptive Sub-Band DCT Coding for HDTV Signal Transmission", *Signal Processing Image Communication*, No. 3, Vol. 2, pp. 333–341, Oct. 1990 European Search Report dated Jul. 21, 1995.

*Primary Examiner*—Richard Lee
*Attorney, Agent, or Firm*—Ratner & Prestia

[57] ABSTRACT

An excellent picture coding scheme, adapted to suit any particular picture movement, divides an input picture data into two-dimensional small blocks including frame small blocks and field small blocks, then calculates the block activity of the frame and field small blocks. By comparing field block activity with frame block activity, a total of two-dimensional blocks indicating that field block activity is greater than frame block activity is calculated. When the total calculated above is equal to or greater than a predetermined value, frame unit coding is performed. When the total calculated above, however, is below the predetermined value, the frame is divided into odd-and even-numbered fields and a field unit coding is performed for the frame.

12 Claims, 9 Drawing Sheets

METHOD AND APPARATUS FOR PICTURE CODING AND METHOD AND APPARATUS FOR PICTURE DECODING

This application is a continuation of application Ser. No. 08/157,627 filed Nov. 24, 1993 which is a continuation-in-part of Ser. No. 871,697, now U.S. Pat. No. 5,347,309 filed Apr. 21, 1992,now abandoned.

FIELD OF THE INVENTION

The invention relates to method and apparatus for picture coding and method and apparatus for picture decoding, and more particularly to method and apparatus for picture coding and method and apparatus for picture decoding of high efficiency effective for transmission or recording of digital images.

BACKGROUND OF THE INVENTION

The transfer rate of digital image reaches hundreds of Mbps to several Gbps, and processing of digital image is restricted by the communication cost at the time of transmission, and limited by the recording capacity of the recording apparatus at the time of recording. It has been accordingly attempted to develop method and apparatus for picture coding capable of minimizing the deterioration of picture quality and lowering the transfer rate at the same time.

As one of such picture coding methods, the motion compensation interframe differential two-dimensional discrete cosine transform (DCT) of the CCIR H.261 standard is described below.

Figure 8:
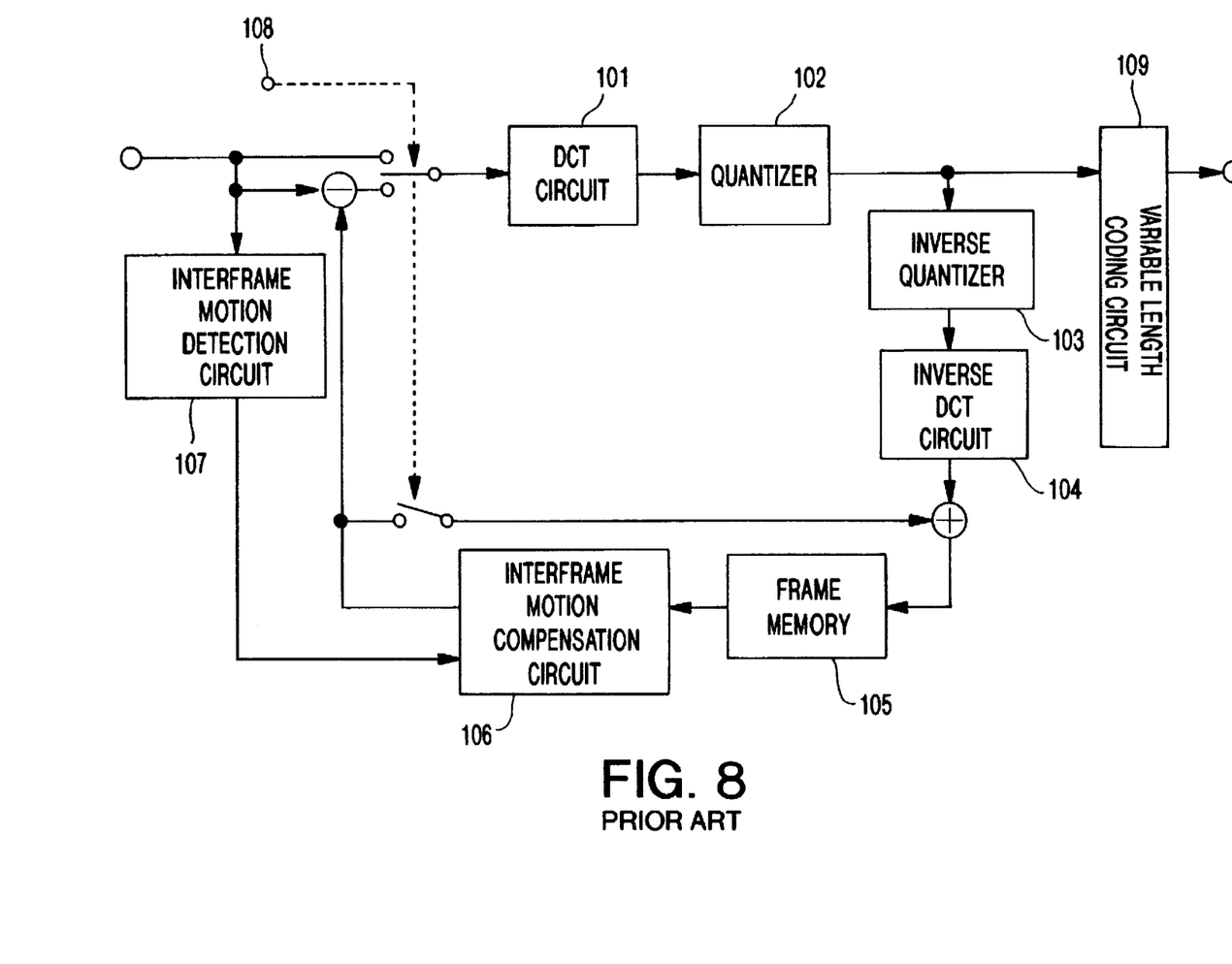
FIG. 8 is a block diagram of a conventional motion compensation interframe differential two-dimensional DCT.

FIG. 8 is a block diagram of motion compensation interframe differential two-dimensional DCT. In FIG. 8, numeral 101 denotes a DCT circuit, 102 is a quantizer, 103 is an inverse quantizer, 104 is an inverse DCT circuit, 105 is a frame memory, 106 is an interframe motion compensation circuit, 107 is an interframe motion detection circuit, 108 is an intraframe/interframe changeover signal, and 109 is a variable length coding circuit.

In this conventional picture coding apparatus, the operation is as follows.

Figure 9:
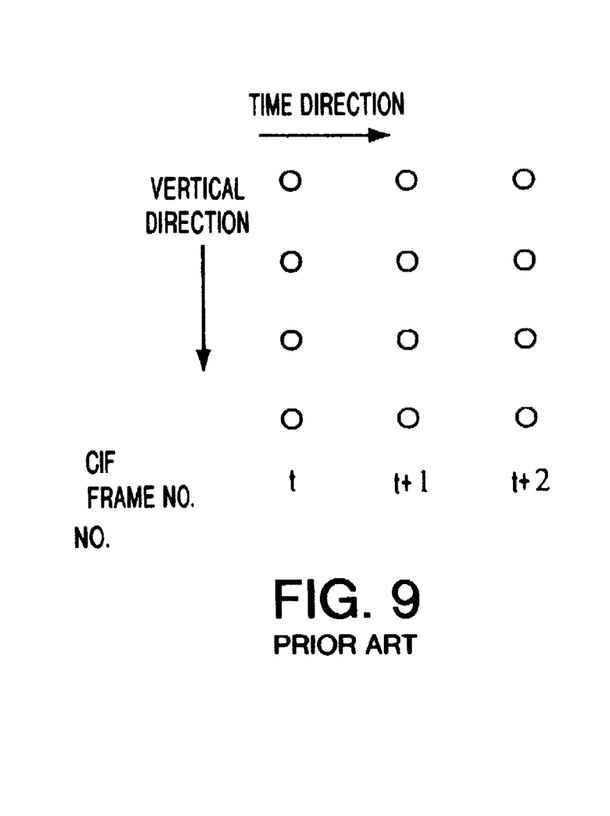
FIG. 9 is a time-space configuration diagram of pixels of CIF.

The input is a noninterlaced image called common intermediate format (CIF). FIG. 9 is a time-space configuration of pixels of input picture, in which the axis of abscissas denotes the time direction and the axis of ordinates represents the vertical direction or the line direction. In the diagram, a set of pixels equal in the time axis is called a CIF frame, and coding is performed in the unit of CIF frame.

The first frame of coding, that is, the picture of frame t is changed over to intraframe coding by an intraframe/interframe changeover signal 108, and is subjected to intraframe coding without considering the difference. That is, the image data is converted into a transform coefficient in the DCT circuit 101 in the unit of two-dimensional block, and the transform coefficient is quantized in the quantizer 102, and is subjected to variable length coding in the variable length coding circuit 109, and is sent out into a transmission route. Generally, the picture is high in correlation, and, as a result of DCT, the energy is concentrated in the transform coefficient corresponding to the low frequency components. Therefore, by quantizing coarsely the high frequency components which are less obvious visually, and finely the low frequency components which are important components, the picture quality deterioration is kept to a minimum, and the quantity of data can be decreased at the same time. The transform coefficient after quantizing is simultaneously returned to the real time data via the inverse quantizer 103 and inverse DCT circuit 104, and accumulated in the frame memory 105.

On the other hand, the pictures after frame (t+1) are subjected to interframe differential coding in each frame. First, in the motion detection circuit 107, by employing, for example, the well-known full search method, the interframe motion vector is determined in every two-dimensional block. The interframe motion compensation circuit 106 generates, making use of the detected motion vector, a predicted value compensating the motion of the next frame in the unit of two-dimensional block. The picture of frame (t+1) is compared with the predicted value generated from frame t in the above method, and the difference or prediction error is calculated. Afterwards, the prediction error is coded in the same manner as in frame t. After frame (t+2), the prediction error is coded in the same manner as in the method of frame (t+1). According to this method, since the prediction error is coded, as compared with the case of directly coding the image data as in the intraframe coding, the energy decreases, and more efficient coding is enabled (for example, refer to CCITT Recommendation H.261, "Codec for audiovisual services at px 64 kbit/s," Geneva, 1990).

Figure 10:
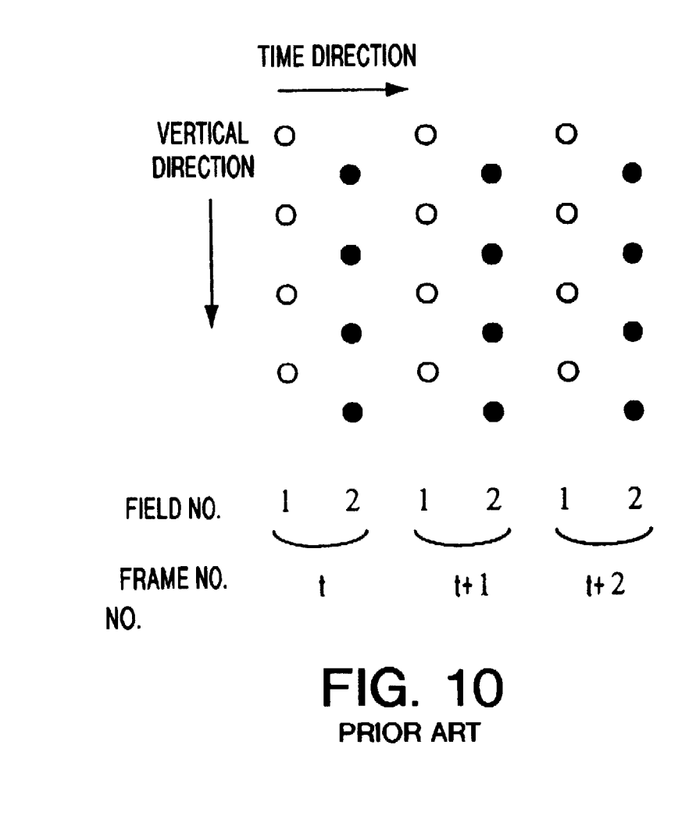
FIG. 10 is a time-space configuration diagram of pixels of interlaced picture.
Figure 11:
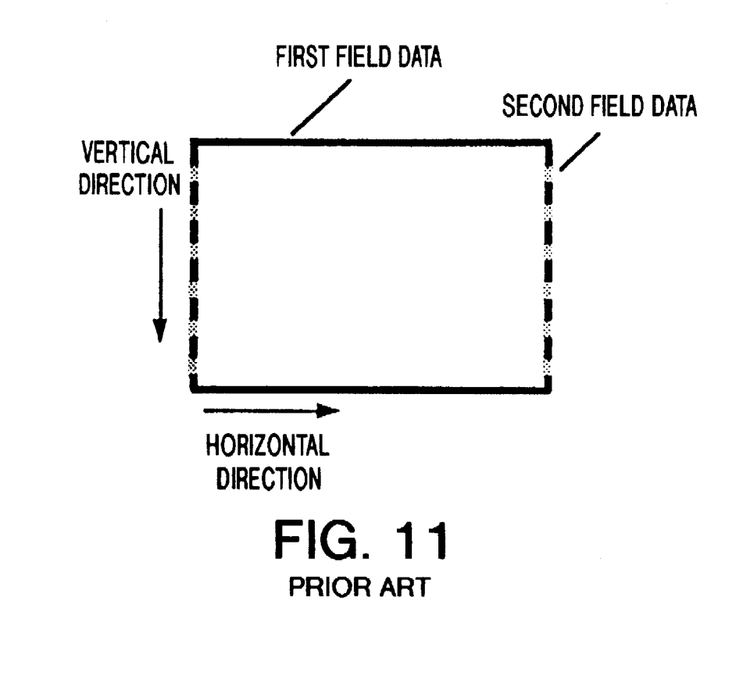
FIG. 11 is an explanatory diagram of frame picture without motion.
Figure 12:
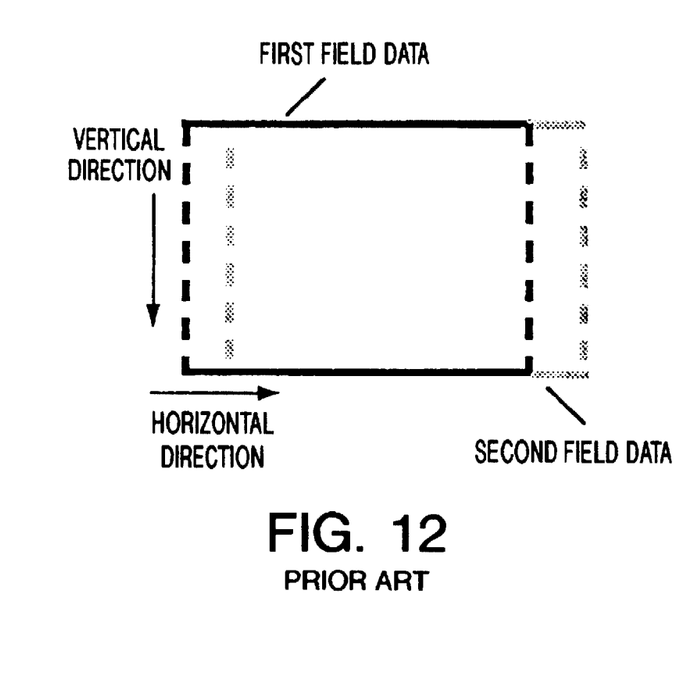
FIG. 12 is an explanatory diagram of frame picture with motion.

In this picture coding method, however, the picture input by interlaced scanning cannot be coded efficiently. The reason is explained by reference to FIGS. 10, 11, and 12. The pictures generally used at the present are scanned by interlacing. FIG. 10 is a time-space configuration of pixels of interlaced picture. FIGS. 11 and 12 explain examples of display of interlaced picture in frame, without motion in FIG. 11, and with a horizontal motion in FIG. 12.

Pixels are disposed at positions deviated in time in every one vertical line by interlacing. In FIG. 10, a set of pixels equal in the time axis is called a field, and two fields differing in the time axis are put together to form a frame, and one frame is composed of field 1 and field 2. Without motion, as shown in FIG. 11, the frame picture is an image of high vertical correlation. With motion involved, the frame picture is deviated by the amount of interfield motion in every field, that is, in every line as shown in FIG. 12. Therefore, it is efficient to code in the unit of frame in the absence of motion, but in the presence of motion, if coded in the frame unit, a high frequency component in the vertical direction corresponding to the field difference occurs, which causes deterioration of picture quality, and it is hence preferred to employ the conventional image coding method in the field unit. The problem was that the optimum coding method varied depending on the motion, that is, coding in the frame unit in the case of small motion and coding in the field unit in the case of large motion.

SUMMARY OF THE INVENTION

It is hence a primary object of the invention to present method and apparatus for picture coding and method and apparatus for its decoding of high efficiency capable of executing optimum coding despite magnitude of motion of picture.

To achieve the object, one of the preferred embodiments of the invention comprises:

means for receiving and storing picture data composed in frames, activity calculating means for calculating the activity of the picture data in every frame, frame/field coding judging means for receiving the activity, and judging to perform frame unit coding when the activity is over a specific value or to perform field unit coding by dividing a frame into fields when the activity is below a specific value, and coding means for coding in frame unit or coding in field unit concerning the picture data on the basis of the judgement, and issuing a coded picture signal containing the frame/field coding judgement signal, whereby picture coding of high efficiency is realized despite magnitude of motion, by coding in field unit when the motion of picture is large, and coding in frame unit by making use of the vertical correlation of picture when the motion is small.

Further objects and effects of the invention will be better understood and appreciated in the following detailed description.

DESCRIPTION OF THE PREFERRED EMBODIMENTS

Referring now to drawings, a first embodiment of method and apparatus for picture coding according to the invention is described below.

Figure 1:
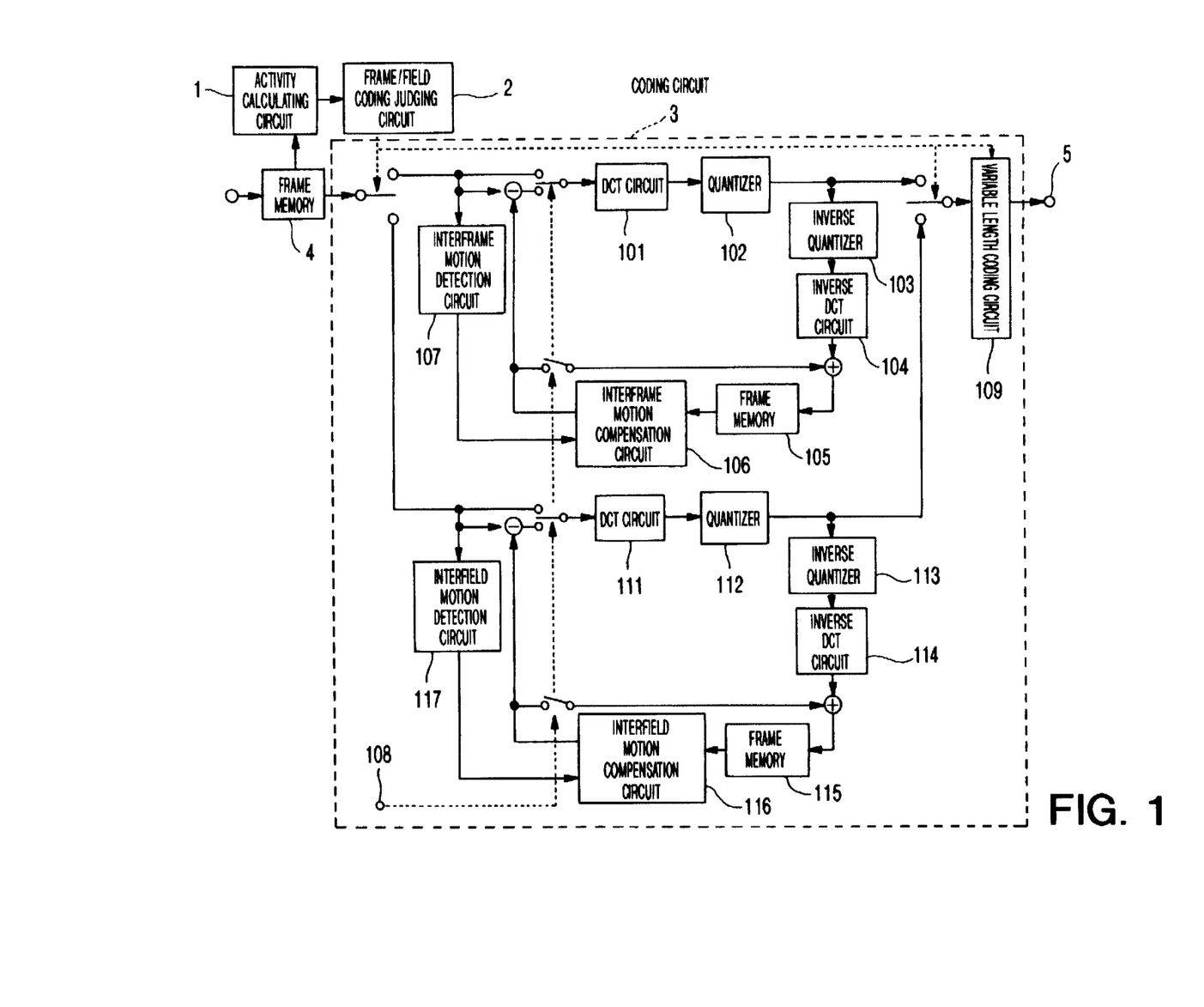
FIG. 1 is a block diagram of a first embodiment of a picture coding apparatus according to the invention.
Figure 2A:
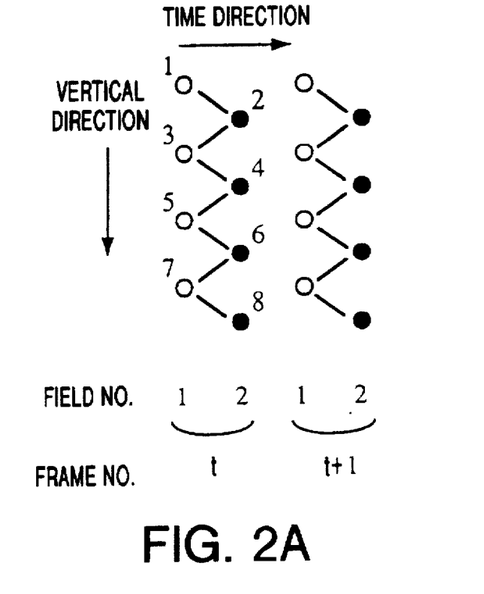
FIG. 2 is an explanatory diagram of coding in frame unit and coding in field unit of the invention.
Figure 2B:
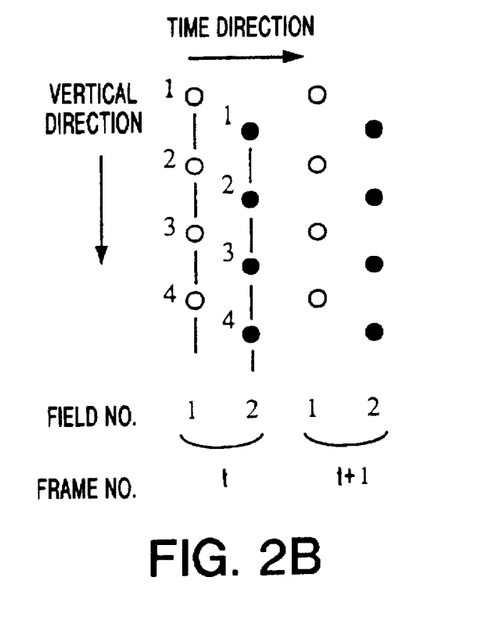
Figure 3:
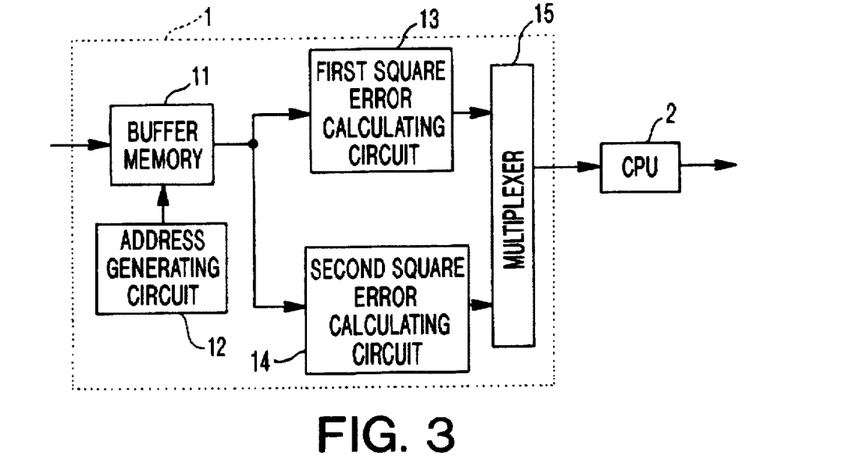
FIG. 3 is a block diagram of activity calculating circuit 1 and frame/field coding judging circuit 2 in FIG. 1.
Figure 4:
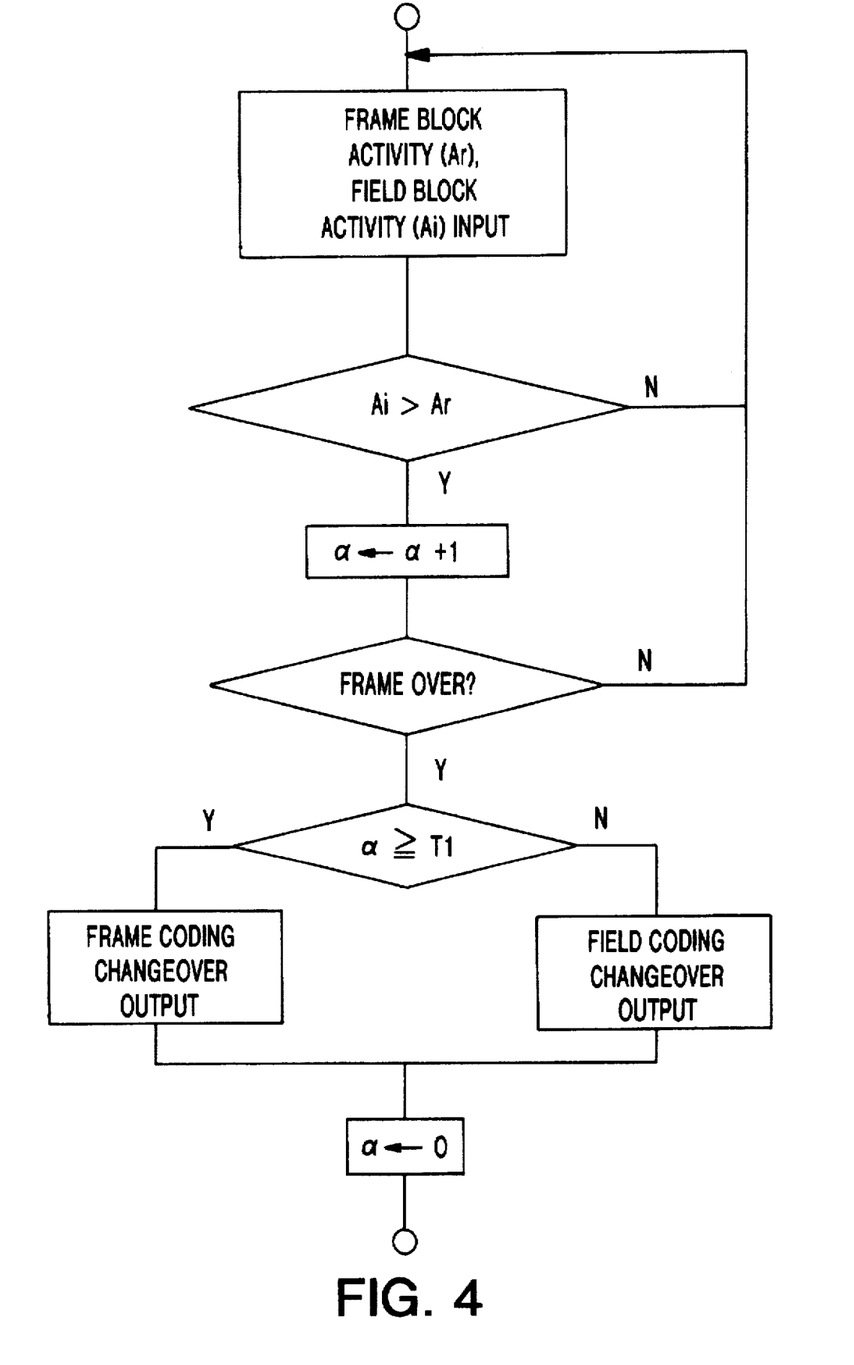
FIG. 4 is a flow chart showing processing in frame/field coding judging circuit of the invention.

FIG. 1 is a block diagram of a picture coding apparatus according to the first embodiment of the invention. FIG. 2a is an explanatory diagram of coding in frame unit wherein the frame is divided into frame blocks including pixels of two field constituting the frame, after which the frame blocks are coded. FIG. 2(b) is an explanatory diagram of coding in field unit wherein the frame is divided into the two fields and each field of the divided field is divided into field blocks including only pixels contained in the each field, after which the field blocks are coded. FIG. 3 is a block diagram of activity calculating circuit and frame/field coding judging circuit in FIG. 1, and FIG. 4 is a flow chart showing processing in frame/field coding judging circuit 2. In FIG. 1, numeral 1 denotes an activity calculating circuit, 2 is a frame/field coding judging circuit, 3 is a coding circuit, 4 is a frame memory, and 5 is a coded picture output terminal.

The image coding apparatus in FIG. 1 is explained by reference to FIGS. 1, 2, 3 and 4.

The input picture in frame unit is stored in the frame memory 4, and at the same time the frame block activity Ar and field block activity Ai are calculated in the activity calculating circuit 1. Ar and Ai are calculated, for example, as follows. The input picture is divided into two-dimensional small blocks in one way such that pixels sequentially numbered in the frame unit as shown in FIG. 2(a) constitute frame small blocks each being expressed as SBR(x, y) (x: horizontal pixel address, $1 \leq x \leq 8$, y" vertical pixel address, $1 \leq y \leq 8$), and in the other way such that pixels sequentially numbered in the field unit as shown in FIG. 2(b) constitute field small blocks each being expressed as Sbi(x, y, n) (x: horizontal pixel address, $1 \leq x \leq 8$, y: vertical pixel address, $1 \leq y \leq 4$, n: small block address, $1 \leq n \leq 2$). Subsequently adding the energy sum of interline difference of every line in each block, the frame block activity Ar and field block activity Ai are obtained. They are expressed in the following equations.

$$Ar = \sum_{x=1}^{8} \sum_{y=1}^{8,2} (Sbr(x, y+1) - Sbr(x, y))^2 \qquad \text{[Formula 1]}$$

$$Ai = \sum_{n=1}^{2} \sum_{x=1}^{8} \sum_{y=1}^{4,2} (Sbi(x, y+1, n) - Sbi(x, y, n))^2$$

FIG. 3 is an example of activity calculating circuit 1, which comprises a buffer memory 11 for dividing the input picture into two-dimensional small blocks, an address generating circuit 12 for generating its address, first and second square error calculating circuits 13, 14 for calculating square errors or Ar, Ai, and a multiplexer 15 for multiplexing and issuing Ar, Ai.

Thus obtained block activities are fed into the frame/field coding judging circuit 2. In FIG. 3, the frame/field coding judging circuit 2 is composed of central processing unit (CPU). Reference is made to FIG. 4 which shows the operation of the CPU. The input frame activity Ar and field activity Ai are compared in magnitude in every two-dimensional block, and the number α of blocks of Ai>Ar in one frame is calculated (α is referred to as activity hereinafter). Next, activity α is compared with an experimentally determined value T1, and if $\alpha \geq T1$, a changeover signal showing frame coding is issued, and if $\alpha < T1$, a changeover signal showing field coding is issued, in every frame.

In the case of small motion, since the correlation of vertical pixels is high, the relation is Ai>Ar. In the case of large motion, to the contrary, the difference between different fields is large, and it is Ai<Ar. Therefore, when T1 is set as ½ of the number of blocks in one frame, for example, by comparing Ar and Ai in every block, when the number of blocks α of Ai>Ar occupies the majority in one frame, that frame is judged to be efficient in coding in frame unit. To the contrary, if the number of blocks satisfying Ar>Ai is many, coding in field unit is judged to be appropriate. Herein, coding in frame unit and field unit is coding or decoding in the unit of frame in terms of the time, or in the unit of field, as shown in FIGS. 2 (a), (b), respectively. In the frame unit, field 1 and field 2 of time t must be coded and decoded simultaneously, but in the field unit, on the other hand, field 1 and field 2 of time t are coded and decoded at separate times.

The coding circuit 3 employs, for example, a motion compensation interframe differential two-dimensional DCT circuit in the prior art, and a motion compensation interfield differential two-dimensional DCT circuit applying the prior art in the field unit. The main difference between the motion compensation interframe differential two-dimensional DCT circuit and the motion compensation interfield differential two-dimensional DCT circuit are whether the object of coding is the block in frame unit as shown in FIG. 2 (a) or the block in field unit as shown in FIG. 2 (b), and whether the motion detection and motion compensation are frame interval or field interval. Therefore, the difference in circuit lies only in the motion detection circuits 107, 117, and motion compensation circuits 106, 116.

If the result of judgement by the frame/field coding judging circuit 2 is coding in frame unit, the frame memory 4 issues a frame block. In the coding circuit 3, changing over the switch, the frame unit block is fed into the motion compensation interframe differential two-dimensional DCT circuit, and at the same time, the input of the variable length coding circuit 109 is changed over to the quantizer 102 in the motion compensation interframe differential two-dimensional DCT circuit. In the case of coding in field unit, in the same operation as in the frame unit, the block in the field unit is coded.

The result of judgement by the frame/field coding judging circuit 2 is sent out from the output terminal 5, together with the coded picture signal, through the variable length coding circuit 109.

In this picture coding apparatus, when the interframe correlation is higher than the interfield correlation, it follows that $\alpha \geq T1$, and interframe coding is selected, and in the reverse case, the interfield coding is selected, thereby realizing optimum coding adaptively to the magnitude of the motion.

Figure 5:
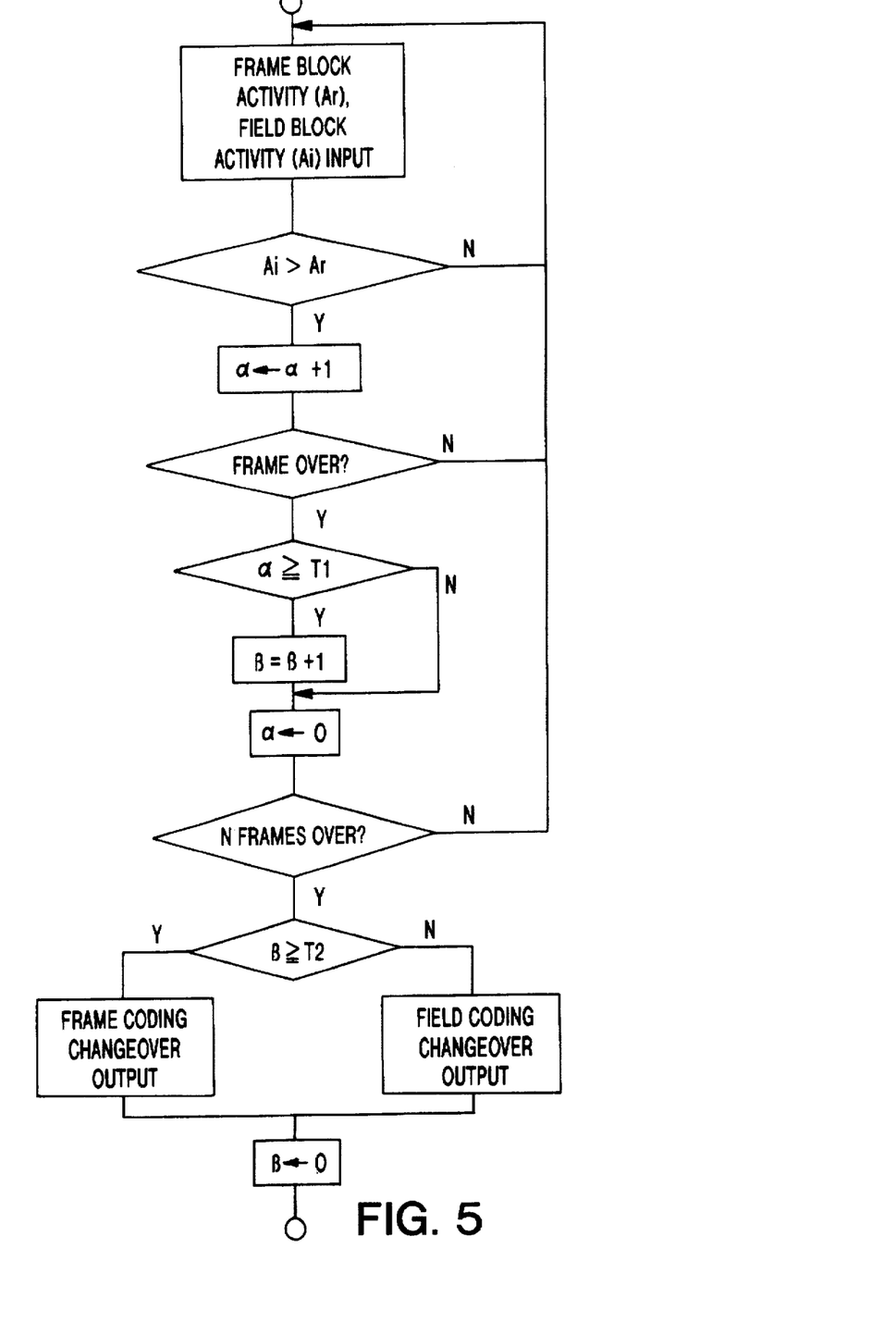
FIG. 5 is a flow chart showing processing in frame/field coding judging circuit in a second embodiment of the invention.

FIG. 5 is a flow chart showing processing in the CPU of the frame/field coding judging circuit 2 in a second embodiment of the invention. What differs from the first embodiment is that the frame coding and field coding are not changed over in every frame, but only once in every N frames. When the number of blocks α of Ai>Ar satisfies the condition of $\alpha \geq T1$, the pointer β showing how many frames have satisfied $\alpha \geq T1$ is added. At the end of N frames, the pointer β is compared with an experimentally determined value T2 (for example T2=N/2), and if $\beta \geq T2$, a changeover signal showing frame coding is issued, and if $\beta < T2$, a changeover signal showing field coding is issued.

Usually, in interframe differential coding, in order to prevent error propagation, intraframe coding is inserted in a specific period. In the second embodiment, the period of intraframe coding is regarded as N frames, and the coding in frame unit and coding in field unit are changed over in the intraframe coding period N. Accordingly, changeover of coding occurs only in N frame periods, and the load of the hardware can be alleviated. Besides, if coding in frame unit and in field unit is frequency changed over in every frame, the picture quality may fluctuate, but it is changed over in every N frames in the second embodiment, so that fluctuation of picture quality may be avoided.

In the second embodiment, it is judged by the number of times β occurring in N frames, but in order to further avoid fluctuations of picture quality, it may be also possible to set to change over if occurring x times continuously. In usual pictures, it is very rare that a moving part and a slow moving part are changed over in every frame, but a picture continues for several frames or several seconds. Therefore, by setting N=15, x=8, that is, by changing over coding in frame unit or coding in field unit when the majority conforms to the condition continuously during 0.5 sec, a sufficient performance is obtained.

In the foregoing embodiments, the block activities Ar, Ai are determined by Formula 1, but it is not limitative, and for example, it may be the sum of the AC energy of frame and field blocks. That is, using Sbr, Sbi in the first embodiment, first the mean values of each small block mr, mi(n) are determined. Then, using mean values mr, mi(n), the AC energy of each small block is determined, and the sum of AC energies of small blocks is calculated to obtain Ar, Ai. They are expressed in the following equations.

[Formula 2]

$$mr = \frac{1}{64} \sum_{x=1}^{8} \sum_{y=1}^{8} Sbr(x, y)$$

$$Ar = \sum_{x=1}^{8} \sum_{y=1}^{8} (Sbr(x, y) - mr)^2$$

$$mi(n) = \frac{1}{32} \sum_{x=1}^{8} \sum_{y=1}^{4} Sbi(x, y, n)$$

$$Ai = \sum_{n=1}^{2} \sum_{x=1}^{8} \sum_{y=1}^{4} (Sbi(x, y, n) - mi(n))^2$$

Judgement of coding in frame unit and coding in field unit is done on the basis of the total number of blocks conforming to the conditions by comparing Ai and Ar in each block, but it is not limitative, and the entire picture may be regarded as one block, and comparison of Ai>Ar is determined only once in every frame, and it is judged on the basis of the result, so that same effects may be obtained.

In comparison of block activities Ai, Ar, it is judged at Ai>Ar in the foregoing embodiments, but by adding an offset it is also possible to judge at (Ai+offset)>Ar. Generally, frame unit coding is more efficient than field unit coding, and hence by judging with offset, it is possible to increase the frequency of frame unit coding.

In the first and second embodiments, the initial value of coding may be either frame unit coding or field unit coding, but in general picture, small movements are in majority, and it may be set at frame unit coding.

Figure 6:
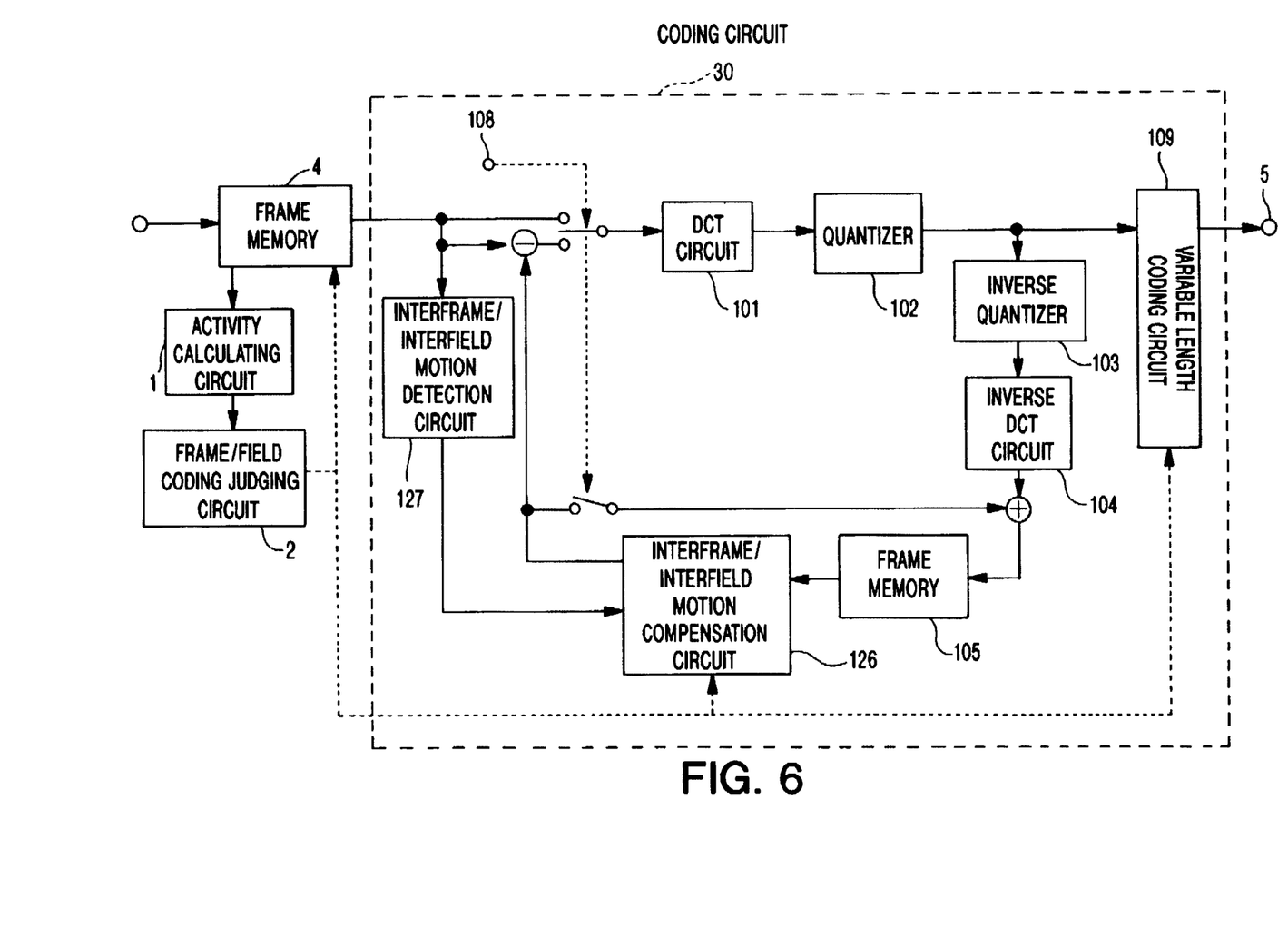
FIG. 6 is a block diagram of a third embodiment of picture coding apparatus according to the invention.

FIG. 6 is a block diagram of a third embodiment of a picture coding apparatus of the invention. What differs from the second embodiment is the constitution of the coding circuit. (In FIG. 6, the coding circuit is indicated by numeral 30.) In the second embodiment, the motion compensation interframe differential two-dimensional DCT circuit and motion compensation interfield differential two-dimensional DCT circuit are changed over by the output of the coding judging circuit 2, but in the third embodiment, the output of the coding judging circuit 2 is fed into an interframe/interfield prediction circuit 126, and it is designed so as to be capable of changing over the motion compensation not only in the block unit but also in the entire picture, so that the coding circuit may be composed of the smaller hardware than in the second embodiment.

Figure 7:
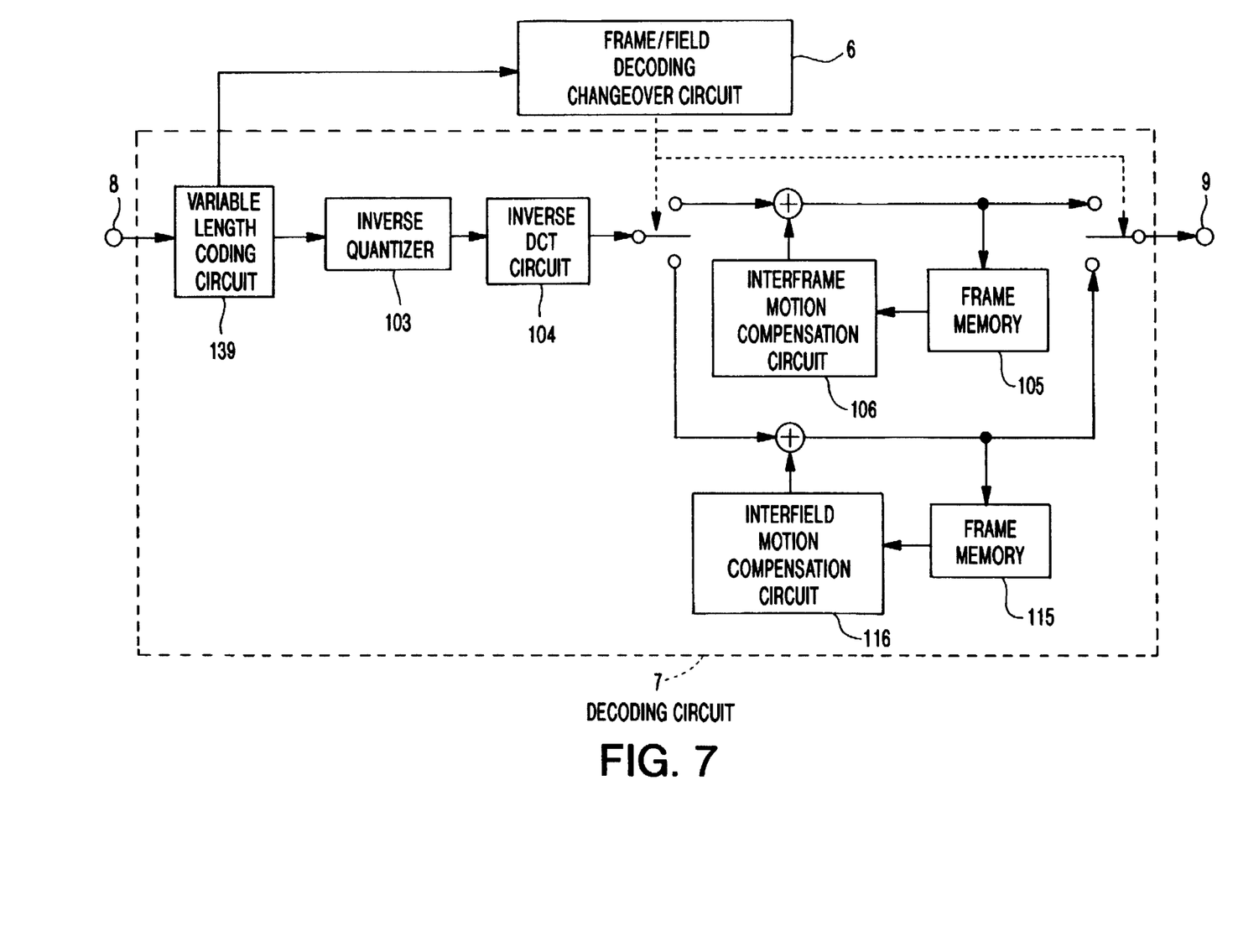
FIG. 7 is a block diagram of an embodiment of a picture decoding apparatus according to the invention.

FIG. 7 is a block diagram of an embodiment of picture decoding apparatus of the invention. The apparatus in FIG. 7 comprises a frame/field decoding changeover circuit 6, a decoding circuit 7, a coding image input terminal 8, and a picture output terminal 9, and operates as follows. The coded picture input is fed into a variable length decoding circuit 139 inside the decoding circuit 7, and is separated into the picture data and frame/field coding judging signal. The frame/field decoding changeover circuit 6 receives the frame/field coding judging signal determined by the activity from the variable length decoding circuit 139, and sends the frame/field decoding changeover signal to the decoding circuit 7. The decoding circuit 7 processes the picture data by inverse quantizing and inverse DCT, and compensates the motion in frame unit or field unit depending on the changeover signal in each circuit, reproduces the picture, and issues the decoded picture in frame unit or field unit selected by the changeover signal. Therefore, by the picture decoding apparatus shown in FIG. 7, the picture having being coded by the foregoing embodiments can be decoded.

In the embodiment in FIG. 7, the motion compensation prediction circuit is composed of different circuits in every frame or field, but it is also possible to simplify by using the motion compensation interframe/interfield prediction circuit as shown in FIG. 6.

In these embodiments, as the example of coding circuit, the motion compensation interframe differential DCT circuit is explained, but it is not limitative, and Hadamard transform, Fourier transform, other orthogonal transform circuits, vector quantizing circuits, and any other means having the function of coding the image can be similarly employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for picture coding comprising the steps of:
   receiving an input picture data composed of frames, each frame including two fields, an odd-numbered field and an even-numbered field;
   storing said input picture data;
   calculating a single activity value of said input picture data for each complete frame;
   comparing said activity value for the complete frame with a predetermined value;
   issuing a change over signal indicating the performance of a frame unit coding which divides each complete frame into a plurality of frame small blocks each being composed of pixels of both of said two fields included in said each complete frame and encoding each of the frame small blocks using a two-dimensional interframe motion compensation, when said activity value is equal to or greater than said predetermined value;
   issuing said change over signal indicating the performance of a field unit coding which divides said each complete frame into a plurality of first field small blocks each being composed of pixels of only one of said two fields included in said each complete frame and a plurality of second field small blocks each being composed of pixels of only the other of said two fields included in said each complete frame and encoding each of the first and second field small blocks using a two-dimensional interfield motion compensation, when said activity value is below said predetermined value; and
   performing said frame unit coding or said field unit coding on the picture data of the complete frame in accordance with said change over signal.

2. The method for picture coding according to claim 1, wherein said step of calculating said activity value comprises the steps of:
   dividing the input picture data into two-dimensional small blocks, wherein said frame is divided into frame small blocks including pixels of said two fields and said frame is divided into field small blocks including only pixels contained in each said odd-numbered and even-numbered fields;
   calculating a frame block activity value of said frame small blocks;
   calculating a field block activity value of said field small blocks;
   comparing said field block activity value with said frame block activity value;
   calculating a total of said two-dimensional small blocks for which said field block activity value is greater than said frame block activity value for the complete frame; and
   issuing said total as said activity value.

3. The method for picture coding according to claim 1, further comprising the steps of:
   changing over to said frame unit coding from said field unit coding when a plurality of activity values calculated for a plurality of frames previous to said frame are all equal to or greater than the predetermined value.
   changing over to said field unit coding from said frame unit coding when the plurality of activity values calculated for the plurality of frames previous to said frame are all below said predetermined value.

4. The method for picture coding according to claim 1, further comprising the steps of:
   changing over to said frame unit coding from said field unit coding at one point of predetermined plural change over points;
   changing over to said field unit coding from said frame unit coding at one point of predetermined plural change over points.

5. An apparatus for picture coding comprising:
   means for receiving and storing an input picture data composed of frames, each frame including two fields, an odd-numbered field and an even-numbered field;
   activity calculating means for calculating a single activity value of said input picture data for each complete frame;
   coding judgment means for receiving said activity value for a complete frame, and 1) deciding to perform a frame unit coding which divides each complete frame into a plurality of frame small blocks each being composed of pixels of both of said two fields included in said each complete frame and encoding each of the frame small blocks using a two-dimensional interframe motion compensation, when said activity value is equal to or greater than a predetermined value, or 2) deciding to perform a field unit coding which divides said each complete frame into a plurality of first field small blocks each being composed of pixels of only one of said two fields included in said each complete frame and a plurality of second field small blocks each being composed of pixels of only the other of said two fields included in said each complete frame and encoding each of the first and second field small blocks using a two-dimensional interfield motion compensation, when said activity value is below said predetermined value, said coding judgment means also generating a coding decision signal indicative of its decision; and
   coding means for performing said frame unit coding or performing said field unit coding on said input picture data composed of said complete frame in accordance with the coding decision signal, and producing a coded picture signal containing said coding decision signal.

6. The apparatus for picture coding according to claim 5, wherein said activity calculating means includes:

means for dividing the input picture data into two-dimensional small blocks, wherein said frame is divided into frame small blocks including pixels of said two fields and said frame is divided into field small blocks including only pixels contained in each said odd-numbered and even-numbered fields;

means for calculating a frame block activity value of said frame small blocks;

means for calculating a field block activity value of said field small blocks;

means for comparing said field block activity value with said frame block activity value;

means for calculating a total of said two-dimensional small blocks for which said field block activity value is greater than said frame block activity value for the complete frame; and means for issuing said total as said single activity value.

7. The apparatus for picture coding according to claim 5, further comprising:

means for changing over to said frame unit coding from said field unit coding when a plurality of activity values calculated for a plurality of frames previous to said frame are all equal to or greater than the predetermined value.

means for changing over to said field unit coding from said frame unit coding when the plurality of activity values calculated for the plurality of frames previous to said frame are all below said predetermined value.

8. The apparatus for picture coding according to claim 5, further comprising:

means for changing over to said frame unit coding from said field unit coding at one point of predetermined plural change over points;

means for changing over to said field unit coding from said frame unit coding at one point of predetermined plural change over points.

9. A method for picture decoding comprising the steps of:

receiving a coded picture signal which has been produced in a coding process by coding picture data composed of frames, each including two fields, an odd-numbered field and an even-numbered field, and extracting a single coding decision signal from said coded picture signal containing said coding decision signal produced during said coding process, said coding decision signal, indicating whether said coded picture signal has been coded by a frame unit coding or coded by a field unit coding which divides each complete frame into a plurality of first field small blocks each being composed of pixels of only one of said two fields included in said each complete frame and a plurality of second field small blocks each being composed of pixels of only the other of said two fields included in said each complete frame and encoding each of the first and second field small blocks using a two-dimensional interfield motion compensation. is calculated based on an activity value which is a total of two-dimensional blocks being calculated by a procedure including the steps of:

1) dividing an original picture data into two-dimensional small blocks including frame small blocks and field small blocks, 2) calculating a frame block activity value of said frame small blocks and a field block activity value of said field small blocks, 3) comparing said field block activity value with said frame block activity value, 4) calculating a total of said two-dimensional blocks for which said field block activity value is greater than said frame block activity value during one frame;

generating a change over signal in response to said coding decision signal, said change over signal containing information on whether said coded picture signal is to be decoded on a frame by frame basis or decoded on a field by field basis; and decoding a complete frame of said coded picture signal on a frame by frame basis or on a field by field basis in response to the change over signal.

10. An apparatus for picture decoding comprising:

means for receiving a coded picture signal which has been produced in a coding process by coding picture data composed of frames, each including two fields, an odd-numbered field and an even-numbered field, and extracting a single coding decision signal from said coded picture signal containing said coding decision signal produced during said coding process, said coding decision signal, indicating whether said coded picture signal has been coded by a frame unit coding or coded by a field unit coding which divides each complete frame into a plurality of first field small blocks each being composed of pixels of only one of said two fields included in said each complete frame and a plurality of second field small blocks each being composed of pixels of only the other of said two fields included in said each complete frame and encoding each of the first and second field small blocks using a two-dimensional interfield motion compensation. is calculated based on an activity value which is a total of two-dimensional blocks being calculated by a procedure including the steps of:

1) dividing an original picture data into two-dimensional small blocks including frame small blocks and field small blocks, 2) calculating a frame block activity value of said frame small blocks and a field block activity value of said field small blocks, 3) comparing said field block activity value with said frame block activity value, 4) calculating a total of said two-dimensional blocks for which said field block activity value is greater than said frame block activity value during one frame;

decoding change over generation means for generating a change over signal in response to the coding decision signal, said change over signal containing information on whether said coded picture signal is to be decoded on a frame by frame basis or decoded on a field by field basis and decoding means for decoding a complete frame of said coded picture signal on a frame by frame basis or on a field by field basis in response to said change over signal.

11. A method for picture decoding comprising the steps of:

receiving a coded picture signal which has been produced in a coding process by coding picture data composed of frames, each frame including two fields, an odd-numbered field and an even-numbered field, and extracting a single coding decision signal from said coded picture signal containing said coding decision signal produced during said coding process, said coding decision signal indicating whether said coded picture signal has been coded by a frame unit coding which divides each complete frame into a plurality of frame small blocks each being composed of pixels of both of said two fields included in said each complete frame and encoding each of the frame small blocks using a two-dimensional interframe motion compensation or coded by a field unit coding which divides said each complete frame into a plurality of first field small blocks each being composed of pixels of only one of said two fields included in said each complete frame and a plurality of second field small blocks each being composed of pixels of only the other of said two fields included in said each complete frame and encoding each of the first and second field small blocks using a two-dimensional interfield motion compensation;

generating a change over signal in response to said coding decision signal, said change over signal containing information on whether said coded picture signal is to be decoded on a frame by frame basis or decoded on a field by field basis; and decoding a complete frame of said coded picture signal on a frame by frame basis or on a field by field basis in response to said change over signal.

12. An apparatus for picture decoding comprising:

means for receiving a coded picture signal which has been produced in a coding process by coding picture data composed of frames, each frame including two fields, an odd-numbered field and an even-numbered field, and for extracting a single coding decision signal from said coded picture signal containing said coding decision signal produced during said coding process, said coding decision signal indicating whether said coded picture signal has been coded by a frame unit coding which divides each complete frame into a plurality of frame small blocks each being composed of pixels of both of said two fields included in said each complete frame and encoding each of the frame small blocks using a two-dimensional interframe motion compensation or coded by a field unit coding which divides said each complete frame into a plurality of first field small blocks each being composed of pixels of only one of said two fields included in said each complete frame and a plurality of second field small blocks each being composed of pixels of only the other of said two fields included in said each complete frame and encoding each of the first and second field small blocks using a two-dimensional interfield motion compensation;

decoding change over signal generation means for generating a change over signal in response to said coding decision signal, said change over signal containing information on whether said coded picture signal is to be decoded on a frame by frame basis or decoded on a field by field basis; and decoding means for decoding a complete frame of said coded picture signal on a frame by frame basis or on a field by field basis in response to said change over signal.

* * * * *

UNITED STATES PATENT AND TRADE MARK OFFICE
CERTIFICATE OF CORRECTION

PATENT NO.   : 5,784,107
DATED        : July 21, 1998
INVENTOR(S)  : Takahashi

It is certified that error appears in the above-identified patent and that said Letters Patent is hereby corrected as shown below:

On the cover page, item [56] References Cited, U.S. Patent Documents, delete "4,271,609  6/1981 Hatori et al.".

Signed and Sealed this

Twentieth Day of April, 1999

Attest:

Q. TODD DICKINSON

*Attesting Officer*   *Acting Commissioner of Patents and Trademarks*